United States Patent
Vaagen

[19]

[11] Patent Number: 5,848,564
[45] Date of Patent: Dec. 15, 1998

[54] COMBINATION SAW BLADE APPARATUS

[76] Inventor: Duane Vaagen, 565 W. 5th St., Colville, Wash. 99114

[21] Appl. No.: 805,372

[22] Filed: Feb. 24, 1997

[51] Int. Cl.⁶ ..................................................... B27B 33/08
[52] U.S. Cl. ............................... 83/853; 83/835; 83/854; 83/855
[58] Field of Search .............................. 83/835, 853, 854, 83/855, 849, 837, 863, 852, 848, 850, 851, 839, 869; 407/30, 62, 116, 117, 862, 663, 678; 144/134.1, 218, 240, 229, 116, 39; 451/542; 125/15

[56] References Cited

U.S. PATENT DOCUMENTS

| | | |
|---|---|---|
| 297,816 | 4/1884 | Ledward . |
| 505,154 | 9/1893 | Bowles . |
| 2,913,024 | 11/1959 | Key . |
| 5,063,980 | 11/1991 | Schultz . |
| 5,379,672 | 1/1995 | Thomas . |

*Primary Examiner*—Eugenia A. Jones
*Assistant Examiner*—T. Anthony Vaughn

[57] ABSTRACT

A saw tooth apparatus is adapted to be connected to and driven by a power source and includes a circular disk-like base connected to the power source. The circular disk-like base is bisected by a centrally located center plane. A plurality of tooth supports are distributed peripherally around the circular disk-like base. Each tooth support has a minimum transverse tooth support thickness, a maximum transverse tooth support thickness, and a tooth support radial height from a geometrical center of the circular disk-like base. A plurality of teeth are provided, and each tooth is supported by a leading side of a respective tooth support. Each tooth includes a most radially distal tooth portion, a pair of arcuately contoured intermediate tooth portions located symmetrically on either side of the center plane and adjacent to the most radially distal tooth portion, and a least radially distal tooth portion located adjacent to the pair of arcuately contoured intermediate tooth portions. The most radially distal tooth portion includes most radial outer side portions which are parallel to the center plane. The least radially distal tooth portion includes least radial outer side portions which are perpendicular to the center plane. Each of the pair of arcuately contoured intermediate tooth portions tapers continuously from a respective most radial outer side portion to a respective least radial outer side portion. When a board is cut, simultaneously, each cut piece is formed with an arcuately contoured edge.

6 Claims, 3 Drawing Sheets

COMBINATION SAW BLADE APPARATUS

BACKGROUND OF THE INVENTION

1. Field of the Invention

The present invention relates generally to circular saw blades and, more particularly, to circular saw blades that perform two cutting functions simultaneously.

2. Description of the Prior Art

The concept of having a single circular saw blade perform two cutting functions is well known in the art. For example, the following U.S. patents disclose some such combination saw blades: U.S. Pat. Nos. 297,816, 505,154, 2,913,024, 5,063,980, and 5,379,672. More specifically, U.S. Pat. No. 297,816 discloses a combination saw blade that makes a first cut at the perimeter of the blade tips and makes two additional cuts at positions along the sidewalls of the cutting blade. For this combination saw blade, openings are made in the sidewalls of the saw. As a result the sidewall may be weakened. In this respect, it would be desirable if a combination saw blade were provided which does not have openings in the sidewalls of the blade.

U.S. Pat. No. 505,154 discloses a combined saw and planar which appears to provide flat planar surfaces as a result of the planing function. There may be a time, however, when, in addition to cutting material such as wood, it would be desirable to provides edges of the cut material with rounded corners. In this respect, it would be desirable if a combination saw blade were provided which provides edges of cut material with rounded corners.

U.S. Pat. No. 5,063,980 discloses a cutter head assembly in which shims are selectively added to or removed from the space between a cutter body and a circular saw blade in a cutter tool assembly for cutting a round on wood products. The use of shims may be time consuming. Moreover, a single round edge is created with this device. In this respect, it would be desirable if a combination saw blade were provided which does not employ shims. Moreover, it would also be desirable if a combination saw blade were provided which simultaneously cuts two round edges on two pieces of material.

U.S. Pat. No. 5,379,672 discloses a saw blade that has pairs of cutting blades separated from one another transversely. As a result each of the pair of blades is supported substantially on one side of the blade. Such transversely paired cutting blades may be very difficult to manufacture. Moreover, the side support for the blades may not be very strong. In this respect, it would be desirable if a combination saw blade were provided which does not employ transversely paired cutting blades. Moreover, it would also be desirable if a combination saw blade were provided which does not have cutting blades that are substantially supported by the sides of the blades.

U.S. Pat. No. 2,913,024 may merely be of interest for its disclosure of a hand-held splitter knife.

Still other features would be desirable in a combination saw blade apparatus. For example, to provide stability during spinning of the blade, it would be desirable if a combination saw blade were provided in which second and third cutting edges were arranged symmetrically astride a primary cutting edges.

When a sheet of material, such as a wooden or plastic board, is cut into two pieces, it may be desirable for a symmetrically rounded edges to be created simultaneously on each of the two pieces that result from the cut. In this respect, it would be desirable if a combination saw blade were provided which cuts a sheet of material into two pieces and simultaneously creates a rounded edge on each of the two pieces, wherein the two rounded edges are symmetrical with respect to each other.

Thus, while the foregoing body of prior art indicates it to be well known to use combination saw blades, the prior art described above does not teach or suggest a combination saw blade apparatus which has the following combination of desirable features: (1) does not have openings in the sidewalls of the blade; (2) provides edges of cut material with rounded corners; (3) does not employ shims; (4) simultaneously cuts two round edges on two pieces of material; (5) does not employ transversely paired cutting blades; (6) does not have cutting blades that are substantially supported by the sides of the blades; (7) has second and third cutting edges which are arranged symmetrically astride a primary cutting edges; and (8) cuts a sheet of material into two pieces and simultaneously creates a rounded edge on each of the two pieces, wherein the two rounded edges are symmetrical with respect to each other. The foregoing desired characteristics are provided by the unique combination saw blade apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a saw tooth apparatus which is adapted to be driven by a power source and which includes a circular disk-like base which includes connection means for connecting the circular disk-like base to the power source. The circular disk-like base is bisected by a centrally located center plane. A plurality of tooth supports are distributed peripherally around the circular disk-like base. Each tooth support has a minimum transverse tooth support thickness, a maximum transverse tooth support thickness, and a tooth support radial height from a geometrical center of the circular disk-like base. A plurality of teeth are provided, and each tooth is supported by a leading side of a respective tooth support. Each tooth includes a most radially distal tooth portion, a pair of arcuately contoured intermediate tooth portions located symmetrically on either side of the center plane and adjacent to the most radially distal tooth portion, and a least radially distal tooth portion located adjacent to the pair of arcuately contoured intermediate tooth portions. Each tooth has a minimum transverse tooth thickness, a maximum transverse tooth thickness, and a tooth radial height from the geometrical center of the circular disk-like base. The most radially distal tooth portion includes most radial outer side portions which are parallel to the center plane. The least radially distal tooth portion includes least radial outer side portions which are perpendicular to the center plane. Each of the pair of arcuately contoured intermediate tooth portions tapers continuously from a respective most radial outer side portion to a respective least radial outer side portion. The tooth radial height is greater than the tooth support radial height. The maximum transverse tooth thickness is greater than the maximum transverse tooth support thickness. In addition, the minimum transverse tooth thickness is greater than the minimum transverse tooth support thickness. A bottom portion of each tooth support is located a radial support distance from a geometrical center of the circular disk-like base.

A plurality of notches are located peripherally on the circular disk-like base. Each of the notches is located between two neighboring tooth supports. The bottommost portions of the notches are located a radial notch distance from the geometrical center of the circular disk-like base. The radial notch distance is less than the radial support distance.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved combination saw blade apparatus which has all of the advantages of the prior art and none of the disadvantages.

It is another object of the present invention to provide a new and improved combination saw blade apparatus which may be easily and efficiently manufactured and marketed.

It is a further object of the present invention to provide a new and improved combination saw blade apparatus which is of durable and reliable construction.

An even further object of the present invention is to provide a new and improved combination saw blade apparatus which is susceptible of a low cost of manufacture with regard to both materials and labor, and which accordingly is then susceptible of low prices of sale to the consuming public, thereby making such combination saw blade apparatus available to the buying public.

Still yet a further object of the present invention is to provide a new and improved combination saw blade apparatus which does not have openings in the sidewalls of the blade.

Still another object of the present invention is to provide a new and improved combination saw blade apparatus that provides edges of cut material with rounded corners.

Yet another object of the present invention is to provide a new and improved combination saw blade apparatus which does not employ shims.

Even another object of the present invention is to provide a new and improved combination saw blade apparatus that simultaneously cuts two round edges on two pieces of material.

Still a further object of the present invention is to provide a new and improved combination saw blade apparatus which does not employ transversely paired cutting blades.

Yet another object of the present invention is to provide a new and improved combination saw blade apparatus that does not have cutting blades that are substantially supported by the sides of the blades.

Still another object of the present invention is to provide a new and improved combination saw blade apparatus which has second and third cutting edges which are arranged symmetrically astride a primary cutting edges.

Yet another object of the present invention is to provide a new and improved combination saw blade apparatus that cuts a sheet of material into two pieces and simultaneously creates a rounded edge on each of the two pieces, wherein the two rounded edges are symmetrical with respect to each other.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein.

DESCRIPTION OF THE PREFERRED EMBODIMENT

Figure 1:
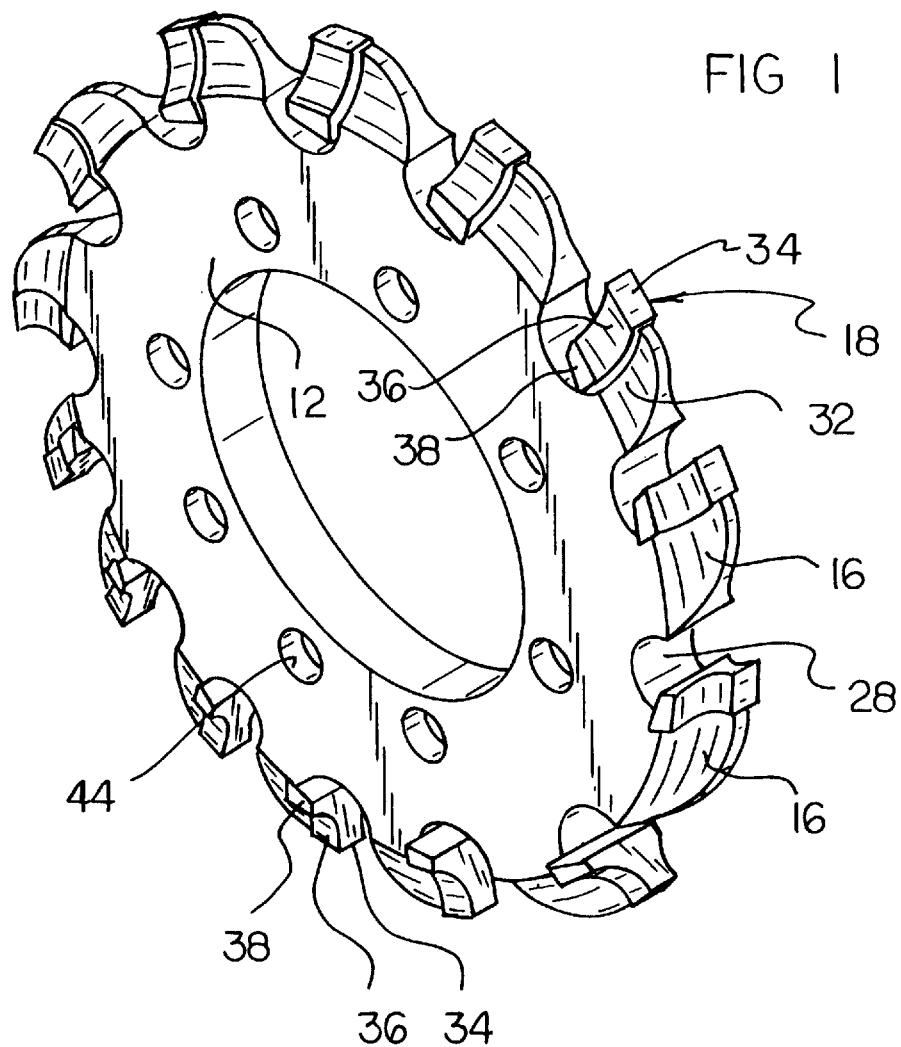
FIG. 1 is a perspective view of a preferred embodiment of the combination saw blade apparatus of the invention.
Figure 2:
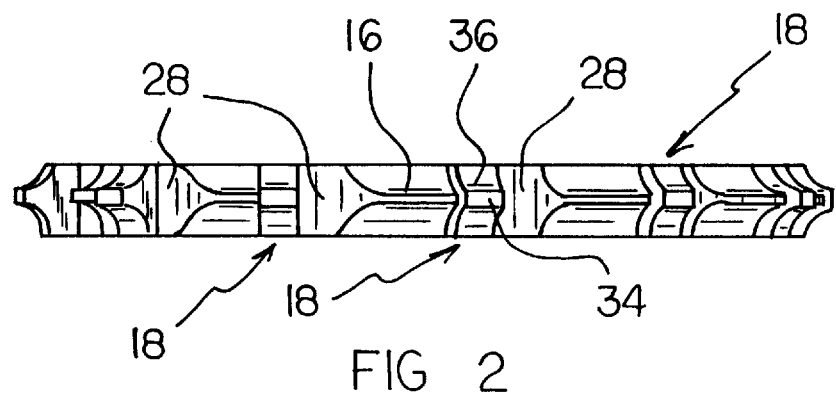
FIG. 2 is a bottom view of the embodiment of the invention shown in FIG. 1.

With reference to the drawings, a new and improved combination saw blade apparatus embodying the principles and concepts of the present invention will be described.

Turning to FIGS. 1–6, there is shown an exemplary embodiment of the combination saw blade apparatus of the invention generally designated by reference numeral 10. In its preferred form, saw blade apparatus 10 is adapted to be driven by a power source (not shown) and includes a circular disk-like base 12 which includes connection means for connecting the circular disk-like base 12 to the power source. The circular disk-like base 12 is bisected by a centrally located center plane 13. The power source is a conventional power source that is used to power a conventional circular saw blade. A plurality of tooth supports 16 are distributed peripherally around the circular disk-like base 12. Each tooth support 16 has a minimum transverse tooth support thickness 17, a maximum transverse tooth support thickness 21, and a tooth support radial height 19 from a geometrical center 24 of the circular disk-like base 12. A plurality of teeth 18 are provided, and each tooth 18 is supported by a leading side 32 of a respective tooth support 16. Each tooth 18 includes a most radially distal tooth portion 34, a pair of arcuately contoured intermediate tooth portions 36 located symmetrically on either side of the center plane 13 and adjacent to the most radially distal tooth portion 34, and a least radially distal tooth portion 38 located adjacent to the pair of arcuately contoured intermediate tooth portions 36. Each tooth 18 has a minimum transverse tooth thickness 23, a maximum transverse tooth thickness 25, and a tooth radial height 27 from the geometrical center 24 of the circular disk-like base 12. The most radially distal tooth portion 34 includes most radial outer side portions 39 which are parallel to the center plane 13. The least radially distal tooth portion 38 includes least radial outer side portions 40 which are perpendicular to the center plane 13. Each of the pair of arcuately contoured intermediate tooth portions 36 tapers continuously from a respective most radial outer side portion 39 to a respective least radial outer side portion 40. The tooth radial height 27 is greater than the tooth support radial height 19. The maximum transverse tooth thickness 25 is greater than the maximum transverse tooth support thickness 21. In addition, the minimum transverse tooth thickness 23 is greater than the minimum transverse tooth support thickness 17. A bottom portion 20 of each tooth support 16 is located a radial support distance 22 from a geometrical center 24 of the circular disk-like base 12.

A plurality of notches 28 are located peripherally on the circular disk-like base 12. Each of the notches 28 is located between two neighboring tooth supports 16. The bottom-most portions 29 of the notches 28 are located a radial notch distance 31 from the geometrical center 24 of the circular disk-like base 12. The radial notch distance 31 is less than the radial support distance 22.

Figure 3:
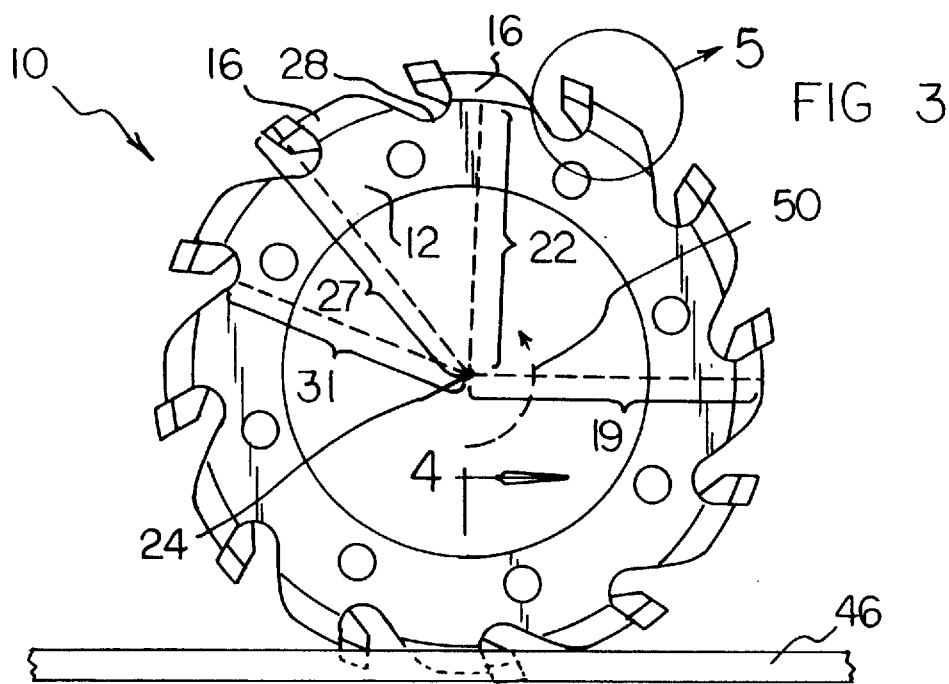
FIG. 3 is a side view of the embodiment of the invention shown in FIGS. 1 and 2 in the process of cutting a board.
Figure 4:
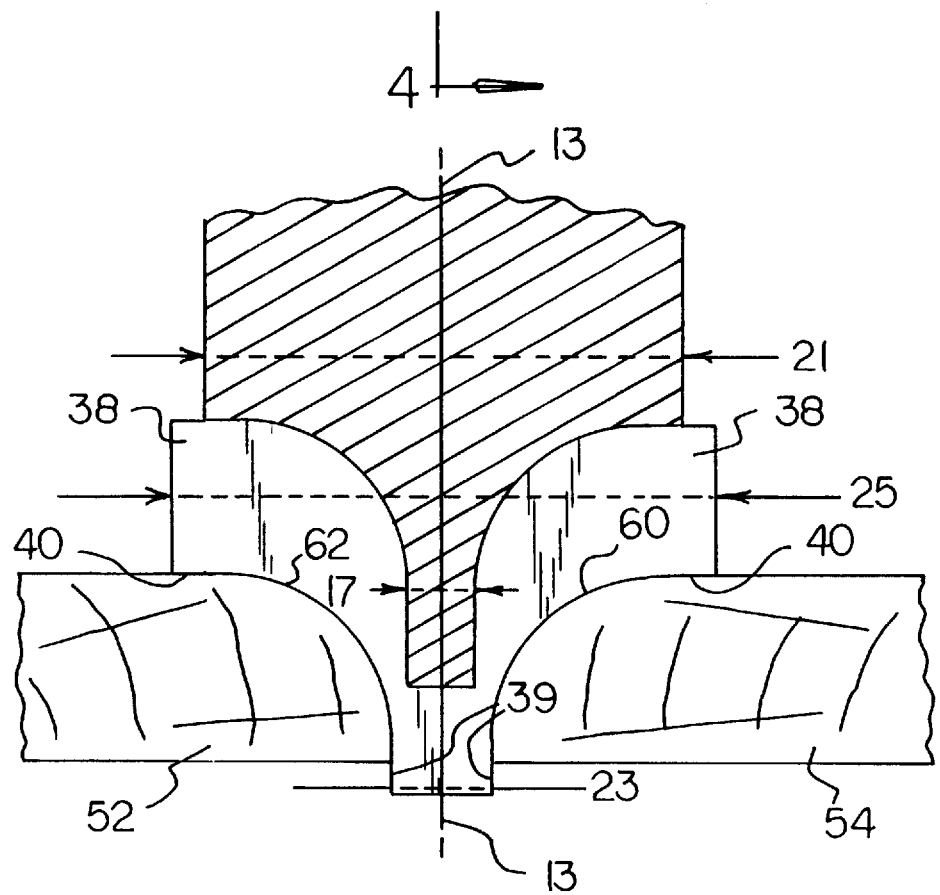
FIG. 4 is an enlarged cross-sectional view of the portion of the embodiment of the invention shown in FIG. 3 taken along line 4—4 thereof.
Figure 5:
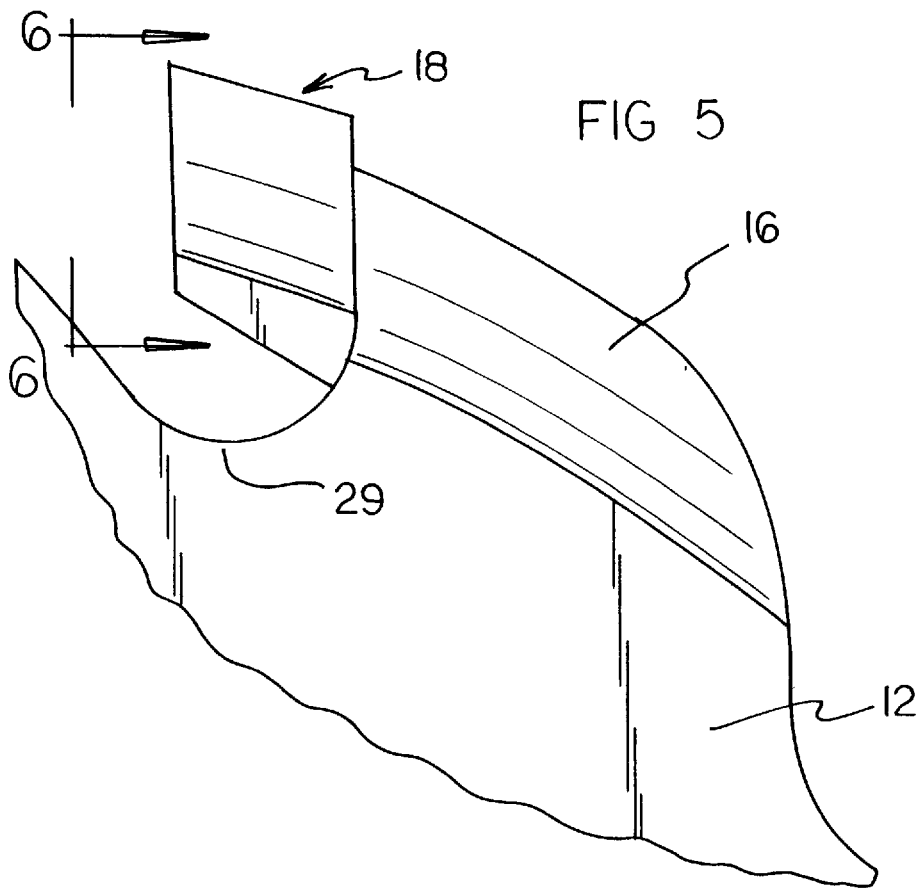
FIG. 5 is an enlarged side view of the portion of the embodiment of the invention shown in encircled region 5 of FIG. 3.
Figure 6:
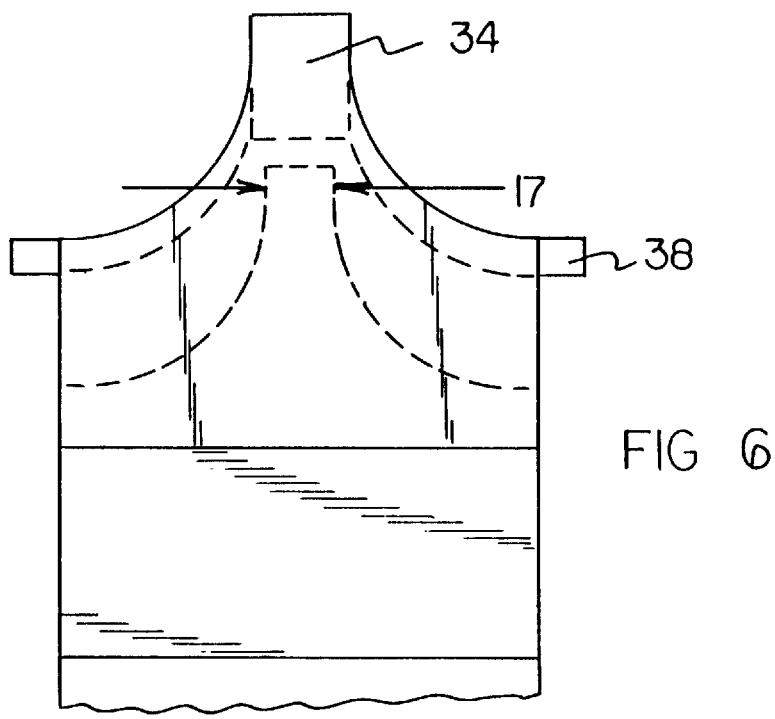
FIG. 6 is an enlarged frontal view of the portion of the embodiment of the invention shown in FIG. 5 taken along line 6—6 thereof.

To use the embodiment of the saw blade apparatus 10 of the invention shown in the drawings, the saw blade apparatus 10 is first is connected to a conventional power source (not shown) in a conventional way. For example, open connection channels 44 can be used to connect the circular disk-like base 12 to the power source. A board 46 is placed in position, as shown in FIG. 3. The power source is turned on so that the saw blade apparatus 10 rotates in a counter-clockwise direction as shown by the directional arrow 50 in FIG. 3. In cutting the board 46, the most radially distal tooth portion 34 of a first tooth penetrates the board 46. Rapidly, the arcuately contoured intermediate tooth portion 36 of that tooth then penetrates the board, and this is rapidly followed by the least radially distal tooth portion 38 of that first tooth. Once this occurs, a portion of the board 46 is cut into two segments 52 and 54 shown in FIG. 4.

When this process is carried out along the entire length of the board 46, the board 46 is cut into two separate pieces. However, not only is the board 46 cut into two pieces, but the newly cut edge of each of the two pieces is formed into a respective arcuately contoured edge surface 60 or 62 by the pair of arcuately contoured intermediate tooth portions 36 of the tooth 18. More specifically, each respective edge surface 60 and 62 tapers continuously from a respective least radial outer edge portion formed by a respective least radial outer side portion 40 to a respective most radial outer edge portion formed by a respective most radial outer side portion 39.

The components of the combination saw blade apparatus of the invention can be made from durable metal materials conventionally used for making saw blades.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved combination saw blade apparatus that is low in cost, relatively simple in design and operation, and which may advantageously be used without having openings in the sidewalls of the blade. With the invention, a combination saw apparatus provides edges of cut material with rounded corners. With the invention, a combination saw apparatus is provided which does not employ shims. With the invention, a combination saw apparatus is provided which simultaneously cuts two round edges on two pieces of material. With the invention, a combination saw apparatus is provided which does not employ transversely paired cutting blades. With the invention, a combination saw apparatus is provided which does not have cutting blades that are substantially supported by the sides of the blades. With the invention, a combination saw apparatus is provided which has second and third cutting edges which are arranged symmetrically astride a primary cutting edges. With the invention, a combination saw apparatus is provided which cuts a sheet of material into two pieces and simultaneously creates a rounded edge on each of the two pieces, wherein the two rounded edges are symmetrical with respect to each other.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the foregoing Abstract provided at the beginning of this specification is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A saw tooth apparatus adapted to be driven by a power source, comprising:

a circular base which includes connection means for connecting said circular base to the power source, wherein said circular base is bisected by a centrally located center plane, a plurality of tooth supports distributed peripherally around said circular base, wherein each tooth support has a minimum transverse tooth support thickness, a maximum transverse tooth support thickness, and a tooth support radial height from a geometrical center of said circular base, and a plurality of teeth, wherein each tooth is supported by a leading side of a respective tooth support, wherein each tooth includes a most radially distal tooth portion, a pair of arcuately contoured intermediate tooth portions located symmetrically on either side of said center plane and adjacent to said most radially distal tooth portion, and a least radially distal tooth portion located adjacent to said pair of arcuately contoured intermediate tooth portions, wherein each tooth has a minimum transverse tooth thickness, a maximum transverse tooth thickness, and a tooth radial height from the geometrical center of said circular base, and wherein said most radially distal tooth portion includes most radial outer side portions, said most radial outer side portions defining coextensive portions of said arcuately contoured intermediate tooth portions adjacent thereto, which coextensive portions are substantially parallel to said center plane, said least radially distal tooth portion includes least radial outer side portions, said least radial outer side portions defining coextensive portions of said arcuately contoured intermediate tooth portions adjacent thereto, which coextensive portions are substantially perpendicular to said center plane, and each of said pair of arcuately contoured intermediate tooth portions tapers continuously from a respective most radial outer side portion to a respective least radial outer side portion, wherein said tooth radial height is greater than said tooth support radial height, wherein said maximum transverse tooth thickness is greater than said maximum transverse tooth support thickness.

2. The apparatus of claim 1 wherein said minimum transverse tooth thickness is greater than said minimum transverse tooth support thickness.

3. The apparatus of claim 1 wherein a bottom portion of each tooth support is located a radial support distance from a geometrical center of said circular base.

4. The apparatus of claim 3, further including:

a plurality of notches located peripherally on said circular base, wherein each of said notches is located between two neighboring tooth supports.

5. The apparatus of claim 4 wherein bottommost portions of said notches are located a radial notch distance from said geometrical center of said circular base.

6. The apparatus of claim 5 wherein said radial notch distance is less than said radial support distance.

* * * * *